(12) United States Patent
Kinaka

(10) Patent No.: US 8,184,946 B2
(45) Date of Patent: May 22, 2012

(54) RECORDING EDITING APPARATUS

(75) Inventor: Minoru Kinaka, Osaka (JP)

(73) Assignee: Panasonic Corporation, Osaka (JP)

( * ) Notice: Subject to any disclaimer, the term of this patent is extended or adjusted under 35 U.S.C. 154(b) by 270 days.

(21) Appl. No.: 12/670,844

(22) PCT Filed: Aug. 1, 2008

(86) PCT No.: PCT/JP2008/002088
§ 371 (c)(1),
(2), (4) Date: Jan. 26, 2010

(87) PCT Pub. No.: WO2009/016845
PCT Pub. Date: Feb. 5, 2009

(65) Prior Publication Data
US 2010/0226619 A1   Sep. 9, 2010

(30) Foreign Application Priority Data
Aug. 1, 2007   (JP) ................. 2007-200487

(51) Int. Cl.
*H04N 9/80* (2006.01)
(52) U.S. Cl. .................................... 386/241; 386/252
(58) Field of Classification Search .............. None
See application file for complete search history.

(56) References Cited

U.S. PATENT DOCUMENTS
2004/0120695 A1  6/2004  Tsumagari et al.
2006/0140107 A1  6/2006  Kanegae et al.

FOREIGN PATENT DOCUMENTS
| JP | 8-249863 | 9/1996 |
| JP | 2004-206863 | 7/2004 |
| JP | 2006-252723 | 9/2006 |
| JP | 2007-49504 | 2/2007 |
| WO | 2004/032140 | 4/2004 |

*Primary Examiner* — Huy T Nguyen

(57) ABSTRACT

To realize a recording/editing apparatus that does not need to read the management information every time a BD medium is mounted or recording/editing is performed, the present invention provides a recording/editing apparatus that controls recording of an AV stream and a plurality of management information pieces onto a readable and writable recording medium, and editing of the AV stream and the management information pieces recorded on the recording medium, the management information pieces each defining items used for playback control of the AV stream, the recording/editing apparatus comprising: a recording unit operable to record definition count information onto the recording medium, the definition count information indicating, for each of the items, a count of definitions that have been already provided in the corresponding item; and a permitting unit operable to permit the recording and the editing upon a request, on a condition that none of values of the definition count information has reached a maximum count of definitions in the corresponding item recordable on the recording medium.

9 Claims, 14 Drawing Sheets

FIG. 3

Structure of PLAYLIST file

| xxxx.rpls{ | |
|---|---|
| File header () | (p1) |
| PLAYLIST meta information () | (p2) |
| PLAYITEM table () { | |
|     PLAYITEM count | (p3) |
|     LOOP (PLAYITEM count) { | |
|         Reference CLIP information file name | (p4) |
|         Start time information | (p5) |
|         End time information | (p6) |
|     } | |
| } | |
| PLAYLIST marker table () { | |
|     PLAYLIST marker count | (p7) |
|     Loop (PLAYLIST marker count) { | |
|         PLAYLIST marker position information | (p8) |
|     } | |
| } | |
| Vendor specific information () | (p9) |
| } | |

FIG. 4

Structure of CLIP information file

```
xxxx.clpi {
    File header ()                                          (c1)
    CLIP attribute information ()                           (c2)
    Sequence information ()                                 (c3)
    Program sequence information () {                       (c4)
        Program sequence count
        LOOP (Program sequence count) {
            Start position                                  (c5)
            Video/audio attribute information ()            (c6)
        }
    }
    EPMAP () {                                              (c7)
        EPMAP stream entry count                            (11)
        LOOP (EPMAP stream entry count i = 0 ... N) {
            Stream type information [i]                     (c8)
            EPMAP Coarse entry count [i]                    (c9)
            EPMAP Fine entry count [i]                      (c10)
            LOOP (EPMAP stream entry count i = 0 ... N) {   (12)
                LOOP (EPMAP Coarse entry count [i]) {       (13)
                    Reference Fine ID                       (c11)
                    Coarse time information                 (c12)
                    Coarse address information              (c13)
                }
                LOOP (EPMAP Fine entry count [i]) {         (14)
                    Fine time information                   (c14)
                    Fine address information                (c15)
                }
            }
        }
    }
    CLIP marker information () {                            (c16)
        CLIP marker count
        LOOP (CLIP marker count) {
            CLIP marker position information                (c17)
        }
    }
    Vendor specific information ()                          (c18)
}
```

FIG. 5

Structure of info.bdav file

| Info.bdav { | |
|---|---|
|   File header() | (i1) |
|   DISC meta information() | (i2) |
|   PLAYLIST table() { | |
|     PLAYLIST count | (i3) |
|     LOOP (PLAYLIST count) { | |
|       Reference PLAYLIST file name | (i4) |
|     } | |
|   } | |
|   Vendor specific information() { | |
|     Definition count information | (i5) |
|     Signature code | (i6) |
|   } | |
| } | |

FIG. 6

Upper limits of counts of data items recordable on disc

| Data item name | | Upper limit |
|---|---|---|
| Total count of PLAYITEMs | (m1) | 2000 |
| Total count of PLAYLIST markers | (m2) | 1400 |
| Total count of EPMAP Coarse entries | (m3) | 24576 |
| Total count of EPMAP Fine entries | (m4) | 180000 |
| Total count of EPMAP stream entries | (m5) | 1000 |
| Total count of program sequences | (m6) | 1000 |
| Total count of CLIP markers | (m7) | 1000 |

FIG. 7

Structure of definition count information

| Data item name | |
|---|---|
| Total count of PLAYITEMs | (sm1) |
| Total count of PLAYLIST markers | (sm2) |
| Total count of EPMAP Coarse entries | (sm3) |
| Total count of EPMAP Fine entries | (sm4) |
| Total count of EPMAP stream entries | (sm5) |
| Total count of program sequences | (sm6) |
| Total count of CLIP markers | (sm7) |

FIG. 15

Structure of info.bdav file

| Info.bdav { | |
|---|---|
| File header () | (i1) |
| DISC meta information () | (i2) |
| PLAYLIST table () { | |
| PLAYLIST count | (i3) |
| LOOP (PLAYLIST count) { | |
| Reference PLAYLIST file name | (i4) |
| } | |
| } | |
| Definition count information | (i5) |
| Definition count validity flag | (i7) |
| Vendor specific information () { | |
| } | |
| } | | ent information, and does not need to read the management
RECORDING EDITING APPARATUS

TECHNICAL FIELD

The present invention relates to a recording/editing apparatus for recording and editing AV streams on a removable recording medium.

BACKGROUND ART

Recently, BD media have been released as removable recording media that can be used for recording high definition movies. The recording format for BD media has been standardized in System Description Blu-ray Disc Rewritable Format Version 2.0 (hereinafter referred to as "BDRE 2.0 standard") by BDA (Blu-ray Disc Association).

The BDRE 2.0 standard allows HD quality recording of digital broadcasts without degradation. According to the BDRE 2.0 standard, a plurality of management information files are used for managing AV stream files. The management information files are used for managing, as separate files, the count of broadcast programs (hereinafter referred to as "PLAYLIST"), a list of playback sections (hereinafter referred to as "PLAYITEMS") of an AV stream file, and an entry point map (hereinafter referred to as "EPMAP") used for random accesses to the AV stream.

The upper limits of the count of the PLAYLISTs and the count of the PLAYITEMs recordable on a BD medium are defined in the standard (The data structure according to the BDRE 2.0 standard will be described later).

At data recording or data editing in conformity with the BDRE standard, the count of PLAYLISTs and the count of PLAYITEMs, which are managed as separate files of the management information, are not allowed to exceed their upper limits. Thus recording/editing apparatuses have to read all the management information files before the recording or the editing of AV streams, to confirm that the counts do not exceed their upper limits. Such pre-processing procedure before the recording/editing requires a long time (up to 1 to 2 minutes).

In view of the above, Patent Literature 1 discloses a conventional art for reducing the time required for reading data recorded on a recording/playback medium. According to this art, part of the management information used for recording and playback is saved from the recording/playback medium to a built-in backup memory of the apparatus. When the apparatus is powered on (i.e. "PON") or a recording/playback medium is inserted into the apparatus, if required information exists in the backup memory, the apparatus uses the information in the backup memory. This method increases the speed of reading of the management information.
Patent Literature 1: Japanese Patent Application Publication No. 08-249863

SUMMARY OF INVENTION

[Technical Problem]

However, the method disclosed in the Patent Literature 1 requires that the apparatus has a built-in memory for storing a backup copy of the part of the management information. This increases the cost for the apparatus. Also, the capacity of the memory puts a limit on the number of recording/playback media from which the management information files are saved into the apparatus.

The present invention is made in view of this problem. To solve the problem, the present invention aims to provide a recording/editing apparatus that does not require a built-in backup memory for constantly storing part of the management information, and does not need to read the management information every time a BD medium is mounted or recording/editing is performed.

[Solution to Problem]

To achieve the aim, one aspect of the present invention provides A recording/editing apparatus that controls recording of an AV stream and a plurality of management information pieces onto a readable and writable recording medium, and editing of the AV stream and the management information pieces recorded on the recording medium, the management information pieces each defining items used for playback control of the AV stream, the recording/editing apparatus comprising: a recording unit operable to record definition count information onto the recording medium, the definition count information indicating, for each of the items, a count of definitions that have been already provided in the corresponding item; and a permitting unit operable to permit the recording and the editing upon a request, on a condition that none of values of the definition count information has reached a maximum count of definitions in the corresponding item recordable on the recording medium.

ADVANTAGEOUS EFFECTS OF INVENTION

With the stated structure, the recording/editing apparatus pertaining to the present invention records onto the recording medium the definition count information, which shows the count of definitions already provided in each item of the management information for which the maximum count of definitions is provided.

Thus it is unnecessary for the recording/editing apparatus pertaining to the present invention to read the management information every time a request for recording/editing is made. The recording/editing apparatus judges whether recording and editing of an AV stream is permitted or not by simply reading the definition count information. This is effective for the improvement of the responsivity of the apparatus.

BRIEF DESCRIPTION OF DRAWINGS

FIG. 3 schematically shows an internal structure of a PLAYLIST file.

FIG. 4 schematically shows an internal structure of a CLIP information file.

FIG. 5 schematically shows an internal structure of an info.bdav file.

FIG. 6 shows the upper limits pertaining to data recordable on a single BD-RE disc.

FIG. 7 shows a data structure of definition count information.

FIG. 15 schematically shows an internal structure of an info.bdav file pertaining to a modification of the present invention.

REFERENCE SIGNS LIST

Figure 1:
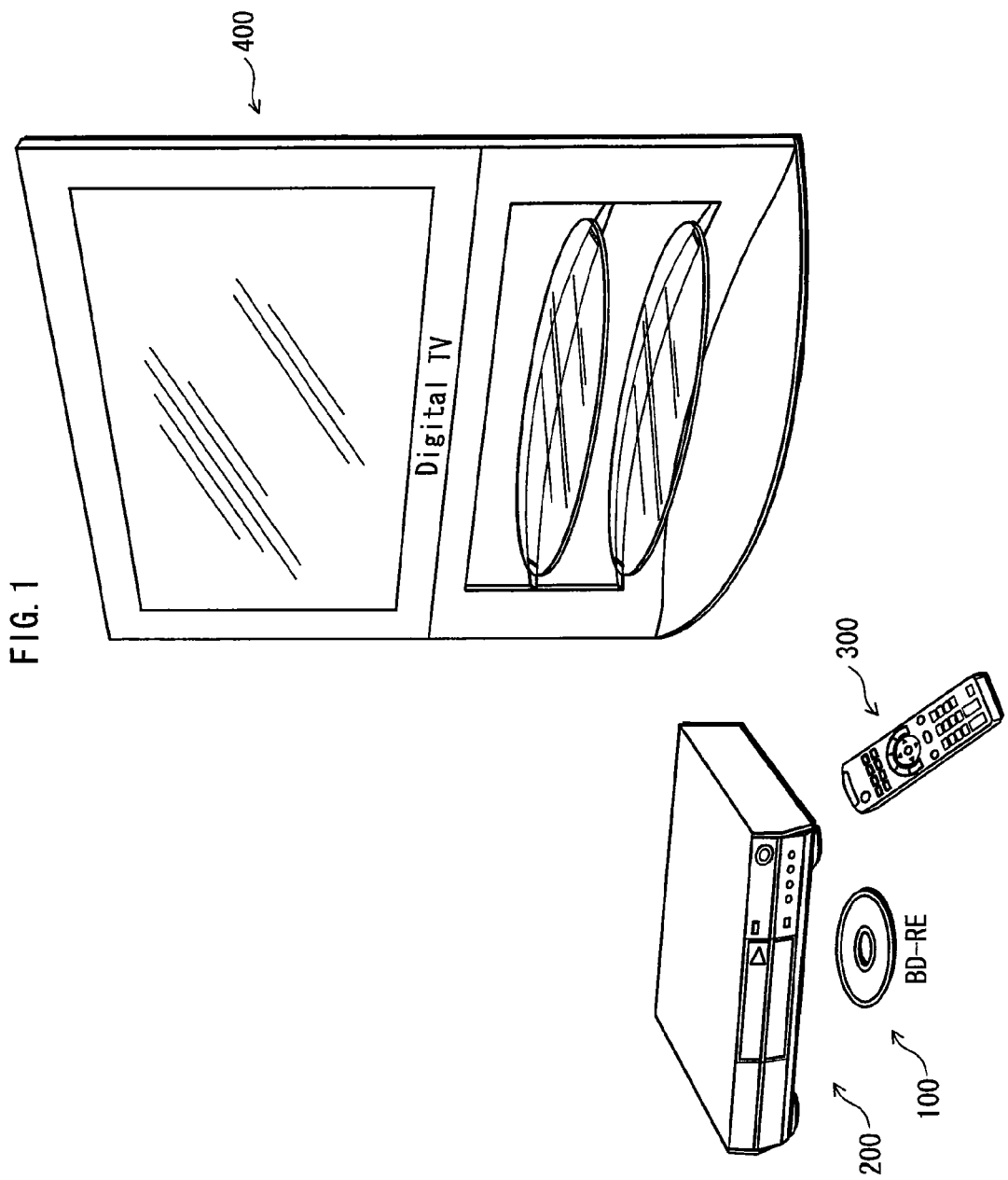
FIG. 1 shows a usage act of a recording/editing apparatus pertaining to the present invention.

2 File system
3 Data management information acquiring unit
4 Definition count information generating unit
5 Memory unit
6 Data management information recording unit
7 Recording/editing unit
8 Signature code creating unit
9 Signature code verifying unit
10 Recording/editing permission judging unit
11 UI unit
12 Timer unit
13 Control unit
100 BD-RE
200 Recording/editing apparatus
300 Remote control
400 TV

DESCRIPTION OF EMBODIMENTS

[First Embodiment]

The following describes an embodiment of a recording/editing apparatus pertaining to the present invention. First, of the implementation acts of the recording/editing apparatus pertaining to the present invention, a usage act is described. FIG. 1 shows a usage act of the recording/editing apparatus pertaining to the present invention. In FIG. 1, the recording/editing apparatus pertaining to the present invention is depicted as a recording/editing apparatus 200. The recording/editing apparatus 200 is used to record and edit digital broadcast video works on a removable recording medium.

Figure 2:
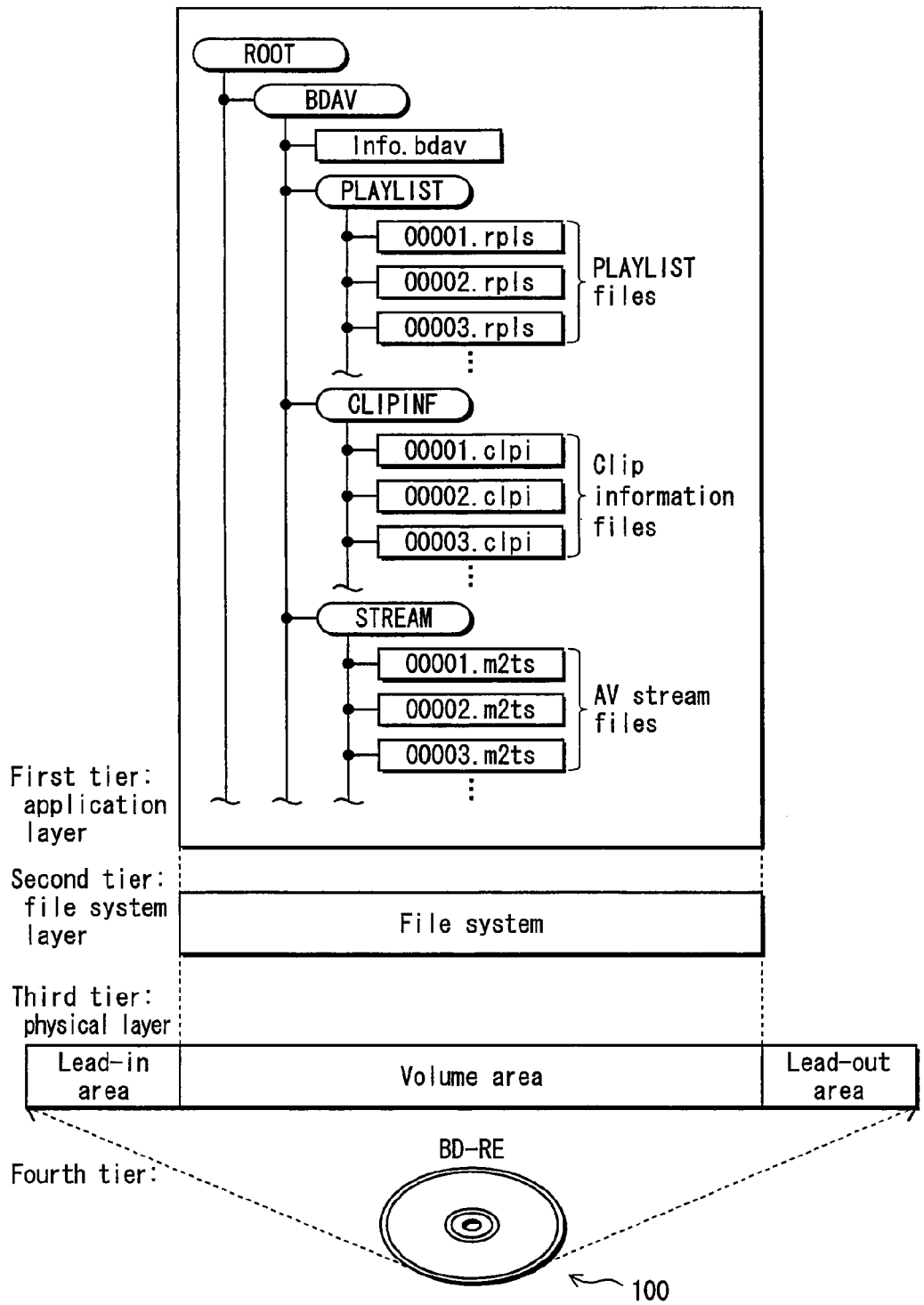
FIG. 2 shows an internal structure of a BD-RE 100.

This completes the description of the usage act of the recording/editing apparatus pertaining to the present invention. Next, a recording medium subject to recording by the recording/editing apparatus 200 is described. It is on a BD-RE 100 that the recording/editing apparatus 200 records video works. FIG. 2 shows an internal structure of the BD-RE 100.

The BD-RE is shown at the $4^{th}$ tier in FIG. 2, while a track on the BD-RE is shown at the $3^{rd}$ tier.

The track depicted in FIG. 2 results from a track spiraling from the inner circumference to the outer circumference of the BD-RE having been drawn out to the sides. This track consists of a lead-in area, a volume area, and a lead-out area.

The volume area in FIG. 2 has a layered structure made up of a physical layer, a file system layer, and an application layer. Onto the volume area, file system information (i.e. volume) and pieces of application data following it, such as video data pieces, are recorded by the recording/editing apparatus 200. The file system is, for example, the UDF or the ISO 9660. Similarly to common PCs, the recording/editing apparatus 200 reads logical data pieces recorded on the medium by using the directories and the file structure. File names and directory names up to 255 characters are readable. The file system information manages the update times and recording addresses of the files. The $1^{st}$ tier in FIG. 2, depicted with a directory structure, shows the application format of the BD-RE on which application data pieces have been recorded by the recording/editing apparatus 200 according to the BDRE 2.0 standard. A BDAV directory is placed under a Root directory at the $1^{st}$ tier in the BD-RE.

The BDAV directory stores, for example, an AV content to be handled on the BD-RE and the management information. Under the BDAV directory are three subdirectories named PLAYLIST directory, CLIPINF directory and STREAM directory, and an info.bdav file.

The STREAM directory stores a file forming the main digital stream. Files having a five-digit file ID and the extension m2ts attached to the ID (e.g. 00001.m2ts) are placed here.

The PLAYLIST directory stores files having a file ID and the extension rpls attached to the ID (e.g. 00001.rpls).

The CLIPINF directory stores files having a file ID and the extension clpi attached to the ID (e.g. 00001.clpi).

The files with the extension m2ts are AV streams, and the files with the extension rpls and the files with the extension clpi are the management information used for the playback control of the AV streams.

These files are described next.

<AV stream>

The files with the extension m2ts are described firstly. The files with the extension "m2ts" are digital AV streams in the MPEG-TS (Transport Stream) format, which can be obtained through multiplexing of one or more video and audio elementary streams. A video stream represents a movie part of the video work, and an audio stream represents an audio part of the video work.

<PLAYLIST file>

The files with the extension "rpls" are PLAYLIST files storing PLAYLIST (PL) information. The PLAYLIST information defines a playback path of an AV stream.

FIG. 3 schematically shows an internal structure of a PLAYLIST file. The PLAYLIST file contains a file header (p1), meta information (p2), a PLAYITEM table, a PLAYLIST marker table, and vendor specific information (P9). More specifically, the file header (p1) contains descriptions of, for example, the initial address of the data stored in the file and the version of the standard. The meta information (p2) contains, for example, the name of the PLAYLIST and the channels (CH) of the recorded programs. The vendor specific information (P9) is information that the vendor can uniquely define within the PLAYLIST file.

The PLAYITEM table shows a PLAYITEM count (p3), a reference CLIP information file name (p4), and a pair of a playback start position (p5) and a playback end position (p6) for each PLAYITEM. The PLAYITEM count (p3) indicates the number of PLAYITEMs registered in the PLAYLIST. Each PLAYITEM shows a playback section. The reference CLIP information file name (p4) is the name of the CLIP information file referred to from the PLAYITEM. The start time information (p5) and the end time information (p6) are based on a reference playback time defined in the CLIP information file indicated by the reference CLIP information file name (p4). Note that the reference CLIP information file name (p4) and the pair of the start time information (p5) and the end time information (p6) are recorded for each of the PLAYITEMs, the number of which is indicated by the PLAYITEM count (p3).

The PLAYLIST marker table contains a PLAYLIST marker count (p7) and PLAYLIST marker position information (p8). PLAYLIST markers are used for searching of a playback start position as, for example, a destination of skipping operation during the playback. The PLAYLIST marker position information (p8) indicates the playback start position of a PLAYLIST marker. Note that the PLAYLIST marker position information is recorded for each of the PLAYLIST markers, the number of which is indicated by the PLAYLIST marker count (p7).

<CLIP information file>

The files with the extension "clpi" are CLIP information files each corresponding to one of the AV streams that has the same file ID. The CLIP information is management information, and thus contains a stream encoding format, a frame rate, a bit rate and a resolution of an AV stream, and an entry point map (EP#map) indicating the start position of a GOP.

FIG. 4 schematically shows an internal structure of a CLIP information file. A CLIP information file contains a file header (c1), CLIP attribute information (c2), sequence information (c3), program sequence information, an EPMAP, CLIP marker information, and vendor specific information (c18). The file header (c1) contains descriptions of, for example, the initial address of the data stored in the file and the version of the standard. The CLIP attribute information (c2) indicates, for example, the attribute of the M2TS file having the same file ID. The sequence information (c3) indicates the arrangement of AV stream files sequentially recorded in the M2TS file having the same file ID.

The program sequence information contains a program sequence count (c4) showing the number of program sequences, the start position (c5) of the program sequence, and attribute information (c6) of, for example, videos and audios of the program sequence. Note that the start position of the program sequence (c5) and the attribute information (c6) are recorded for each of the program sequences, the number of which is indicated by the program sequence count (c4).

The EPMAP contains elementary stream count (c7) and EP#maps. The elementary stream count (c7) indicates the number of elementary streams having an EP#map. Each EP#map associates the playback position information of an M2TS stream with the address thereof. The number of the EP#maps is the same as the elementary stream count (c7).

In the drawing, the EP#maps are described in the loops 11 and 12. Each of the loops 11 and 12 is repeated for the number indicated by the elementary stream count (c7). The symbol i denotes the registration order, and is described as [i] in each loop.

The loop 11 contains stream type information (c8), an EPMAP Coarse entry count (c9) and an EPMAP Fine entry count (c10). The EPMAP Coarse entry count (c9) indicates the number of EPMAP Coarse entries each associating the playback position information of an elementary stream and the address thereof at a coarse granularity level, that is, in units of 5.8 sec at minimum. The EPMAP Fine entry count (c10) indicates the number of EPMAP Fine entries each associating the playback position information of an elementary stream and the address thereof at a fine granularity level, that is, in units of 5.7 msec at minimum.

The loop 12 contains a loop 13 and a loop 14 in the same order as in the loop 11. The loop 13 shows the details of the EPMAP Coarse entries of each elementary stream. The loop 14 shows the details of the EPMAP Fine entries of each elementary stream.

The loop 13, which shows the details of the EPMAP Coarse entries, is repeated for the number indicated by the EPMAP Coarse entry count (c9) of the $i^{th}$ elementary stream. The loop 13 contains a reference Fine ID (c11), Coarse time information (c12), and Coarse address information (c13). The reference Fine ID (c11) shows, for each EPMAP Coarse entry, the order within the loop 14 of the detailed playback time information associated with the entry. The Coarse time information (c12) indicates the playback start time of the EPMAP Coarse entry.

The loop 14, which shows the details of the EPMAP Fine entries, is repeated for the number indicated by the EPMAP Fine entry count (c10) of the $i^{th}$ elementary stream. The loop 14 contains, for each of the EPMAP Fine entries, Fine time information (c14) and Fine address information (c15).

The CLIP marker information contains a CLIP marker count (c16), and CLIP marker position information (c17). The CLIP marker count indicates the number of CLIP markers each showing the position of a CLIP. The CLIP marker position information (c17) is recorded for each of the CLIP markers, the number of which is indicated by the CLIP marker count (c16).

<info.bdav>

Next, the info.bdav file is descried. The info.bdav file is management information for the BD-RE. The info.bdav file is firstly read when the disc is inserted into the recording/editing apparatus, so that the recording/editing apparatus recognizes the disc. The info.bdav file contains a table showing a plurality of programs (PLAYLISTs) recorded on the BD-RE.

FIG. 5 schematically shows an internal structure of an info.bdav file. The info.bdav file contains a file header (i1), meta information (i2), a PLAYLIST table, and vendor specific information. More specifically, the file header (i1) contains descriptions of, for example, the initial address of the data stored in the file and the version of the standard. The meta information (i2) contains, for example, the name of the BDRE disc. The vendor specific information is information that the vendor can uniquely define within the info.bdav file.

The PLAYLIST table shows a PLAYLIST count (i3) and a reference PLAYLIST file name (i4). The PLAYLIST count (i3) indicates the number of programs (PLAYLISTs) recorded on the BD-RE. The reference PLAYLIST file name (i4) is the name of management information for each PLAYLIST. Note that the reference PLAYLIST file name is recorded for each of the PLAYLISTs, the number of which is indicated by the PLAYLIST count (i3).

In addition, in this embodiment of the present invention, definition count information (i5) and a signature code (i6) are included in the vendor specific information contained in the info.bdav file.

<Definition count information>

The following explains the details of the definition count information.

The BDRE 2.0 standard defines an upper limit for each of the items shown in FIG. 6. These items are selected out of the items included in the PLAYLIST file and the CLIP information file, which are used as the management information for AV stream playback control. Each upper limit shows the maximum number of definitions provided in the corresponding item that are permitted to be recorded on a single BD-RE disc.

FIG. 6 shows the upper limit of the count of definitions in each of the item that are recordable on a single BD-RE disc.

The item m1 shows the total of all the PLAYITEM counts (p3) contained in the PLAYLIST files recoded on the single BD-RE disc.

The item m2 shows the total of all the PLAYLIST marker counts (p7) contained in the PLAYLIST files recoded on the single BD-RE disc.

The item m3 shows the total of all the EPMAP Coarse entry counts (c9) contained in the CLIP information files recoded on the single BD-RE disc.

The item m4 shows the total of all the EPMAP Fine entry counts (c10) contained in the CLIP information files recoded on the single BD-RE disc.

The item m5 shows the total of all the elementary stream counts (c7) contained in the CLIP information files recoded on the single BD-RE disc.

The item m6 shows the total of all the program sequence counts (c4) contained in the CLIP information files recoded on the single BD-RE disc.

The item m7 shows the total of all the CLIP marker counts (c16) contained in the CLIP information files recoded on the single BD-RE disc.

According to the conventional BDRE 2.0 standard, the apparatus can obtain the values of the items m1-m7 pertaining to a single BD-RE disc only by reading all the PLAYLIST files and CLIP information files. Thus, until completion of the reading, the apparatus can not judge whether or not it can perform recording and editing on the disc.

The definition count information in accordance with this embodiment contains items sm1-sm7 as FIG. 7 shows. The items sm1-sm7 respectively indicate, in relation to the items m1-m7, the numbers of the corresponding definitions already recorded on the BD-RE disc.

This completes the description of the BD-RE 100. The recording/editing apparatus 200 pertaining to the embodiment of the present invention performs recording and editing of movie works on the BD-RE based on the file structures explained above.

<Recording/editing apparatus 200>

Next, the details of the recording/editing apparatus 200 pertaining to the embodiment of the present invention are described.

Figure 8:
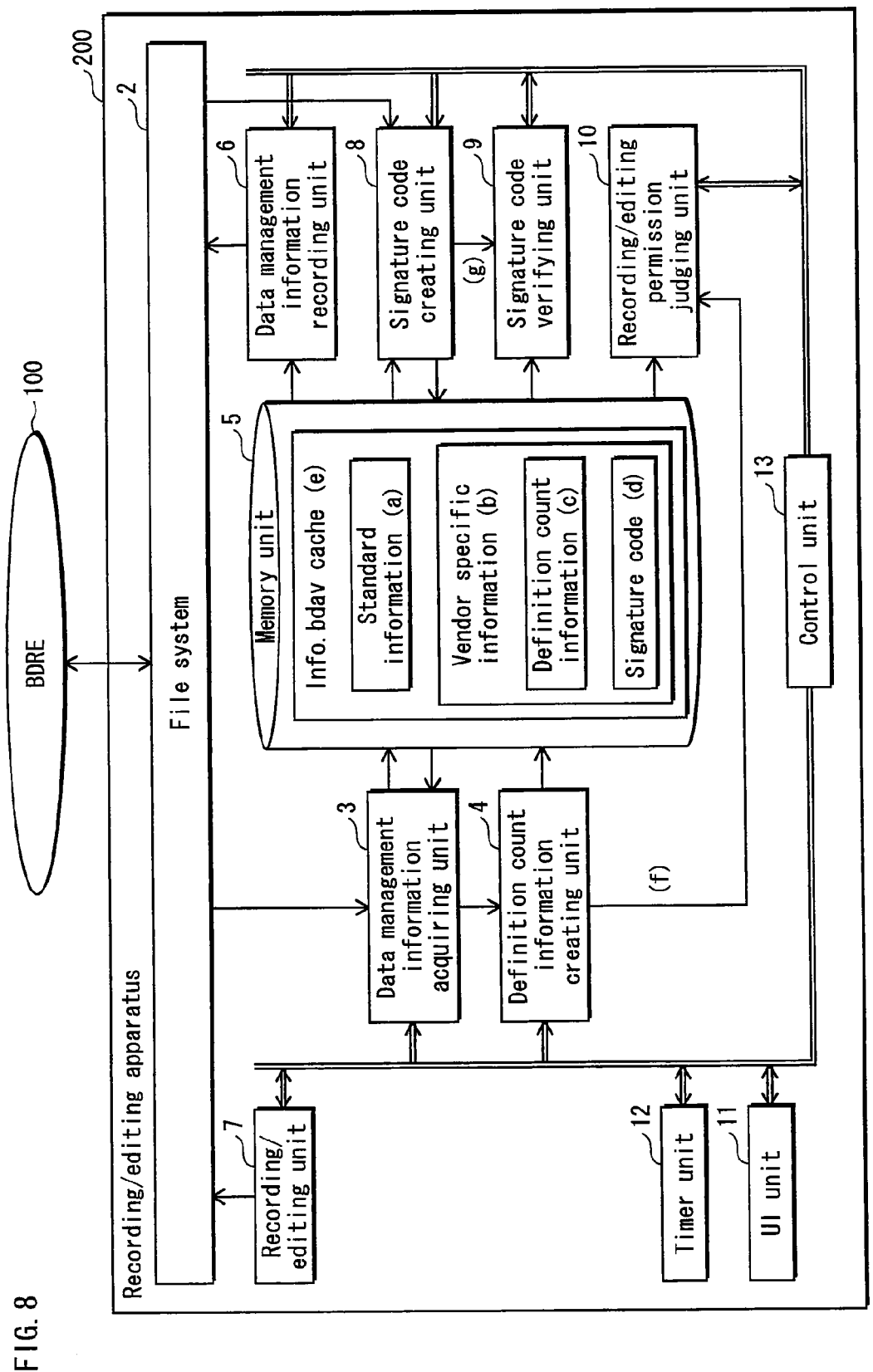
FIG. 8 is a block diagram showing an internal structure of a recording/editing apparatus 200.

FIG. 8 is a block diagram showing an internal structure of the recording/editing apparatus 200. As FIG. 8 shows, the recording/editing apparatus 200 includes a file system 2, a data management information acquiring unit 3, a definition count information creating unit 4, a memory unit 5, a data management information recording unit 6, a recording/editing unit 7, a signature code creating unit 8, a signature code verifying unit 9, a recording/editing permission judging unit 10, a UI unit 11, a timer unit 12, and a control unit 13.

The file system 2 is capable of performing reading and writing, and acquiring file information according to the file structure recorded on the BD-RE 100.

The data management information acquiring unit 3 has a function to read the info.bdav file, the PLYLIST files and the CLIP information files recorded on the BD-RE 100, via the file system 2. The data management information acquiring unit 3 also has a function to read the update time and the recording address of each file from the file system information of the BD-RE 100. Among the files read by the data management information acquiring unit 3, the info.bdav file is cached as info.bdav cache (e) into the memory unit 5, and the PLAYLIST files and the CLIP information files are output to the definition count information creating unit 4.

The definition information creating unit 4 is a functional block of generating the definition count information shown in FIG. 7 by performing the following procedures: acquiring, from the data management information acquiring unit 3, all the PLAYLIST files and the CLIP information files recorded on the BD-RE 100; and analyzing the contents of the files and obtaining information required for recording and editing in conformity with the BDRE 2.0 standard. The definition count information generated by the definition count creating unit 4 is output as definition count information (c) to the memory unit 5, and as definition count information (f) to the recording/editing permission judging unit 10. Also, the definition count information creating unit 4 updates the definition count information (c) held in the memory unit 5 if the recording/editing unit 7 records an AV stream or edits the relevant management information (info.bdav file, PLAYLIST file and CLIP information file). The updating is performed based on edition results notified from the recording/editing unit 7.

The memory unit 5 has a recording area for the info.bdav cache (e) which includes standard information (a) and the vendor specific information (b). The standard information (a) is the part of the info.bdav file defined in the BDRE 2.0 standard other than the vendor specific information. The vendor specific information (b) includes the definition count information (c) and the signature code (d), and is described in MakerPrivateData ( ).

The data management information recording unit 6 is a functional block that functions as the recording unit and the signature recording unit pertaining to the present invention. The data management information recording unit 6 overwrites via the file system 2 the info.bdav file recorded on the BD-RE 100 with the info.bdav cache (e), which includes the definition count information (c) and the signature code (d) and is held in the memory unit 5.

The recording/editing unit 7 has a function to record an AV stream file (M2TS files) on the BD-RE 100, and to generate or edit the relevant management information (info.bdav file, PLAYLIST file and CLIP information file) and write it on the BD-RE 100. The recording/editing unit 7 performs the writing procedures and the editing procedures only when the recording/editing permission judging unit 10 permits the execution of the procedures.

When the recording/editing unit 7 records an AV stream file, or edits an info.bdav file, a PLAYLIST file or a CLIP information file, the recording/editing unit 7 also notifies the definition count information creating unit 4 of, as the edition results, the change of the definition count information that have been increased or decreased by the recording or the editing.

The signature code creating unit 8 is a functional block that functions as the first signing unit pertaining to the present invention. The signature code creating unit 8 generates a signature code based on the update times of all the PLAYLIST files and CLIP information files recorded on the BD-RE 100 and the standard information held in the memory unit 5. The signature code creating unit 8 outputs the signature code to the memory unit 5, as the signature code (d).

The signature code creating unit 8 also functions as the second signing unit pertaining to the present invention. The signature code creating unit 8 further outputs the signature code to the signature code verifying unit 9, as the signature code (g).

The signature code verifying unit 9 and the recording/editing permission judging unit 10 are function blocks that function together as the permitting unit pertaining to the present invention. The signature code verifying unit 9 compares the signature code (g) generated by the signature code creating unit 8 with the signature code (d) stored in the memory unit 5. If these signature codes are identical, the signature code verifying unit 9 judges that the definition count information (c) is usable. If the signature codes are not identical, the signature code verifying unit 9 judges that the definition count information (c) is not usable.

If the signature code verifying unit judges that the definition count information (c) is usable, the recording/editing permission judging unit 10 judges whether or not recording and editing can be performed by using the definition count information (c) stored held in the memory unit 5. If the signature code verifying unit judges that the definition count information (c) is not usable, the recording/editing permission judging unit 10 judges whether or not recording and editing can be performed by using the definition count information (f) input from the definition count information creating unit 4.

The UI unit 11 gives an instruction to the control unit 13 according to a user operation received from the remote control or the buttons on the body of the apparatus.

The timer unit 12 functions as a timer for timing.

The control unit 13 controls recording and editing of data on the BD-RE 100 by controlling the functional blocks described above, namely the data management information acquiring unit 3, the definition count information creating unit 4, the memory unit 5, the data management information recording unit 6, the recording/editing unit 7, the signature code creating unit 8, the signature code verifying unit 9, the recording/editing permission judging unit 10, the UI unit 11 and the timer unit 12.

This completes the description of the internal structure of the recording/editing apparatus.

<Control unit 13>

The controlling by the control unit 13 with the stated structure is characterized by the following: the definition count information is recorded on the BD-RE 100; and the recording/editing unit 7 is controlled according to the judgment by the recording/editing permission judging unit 10 when recording of an AV stream onto the BD-RE 100 or editing of the management information is requested. The following explains the controlling procedures performed by the control unit 13.

Figure 9:
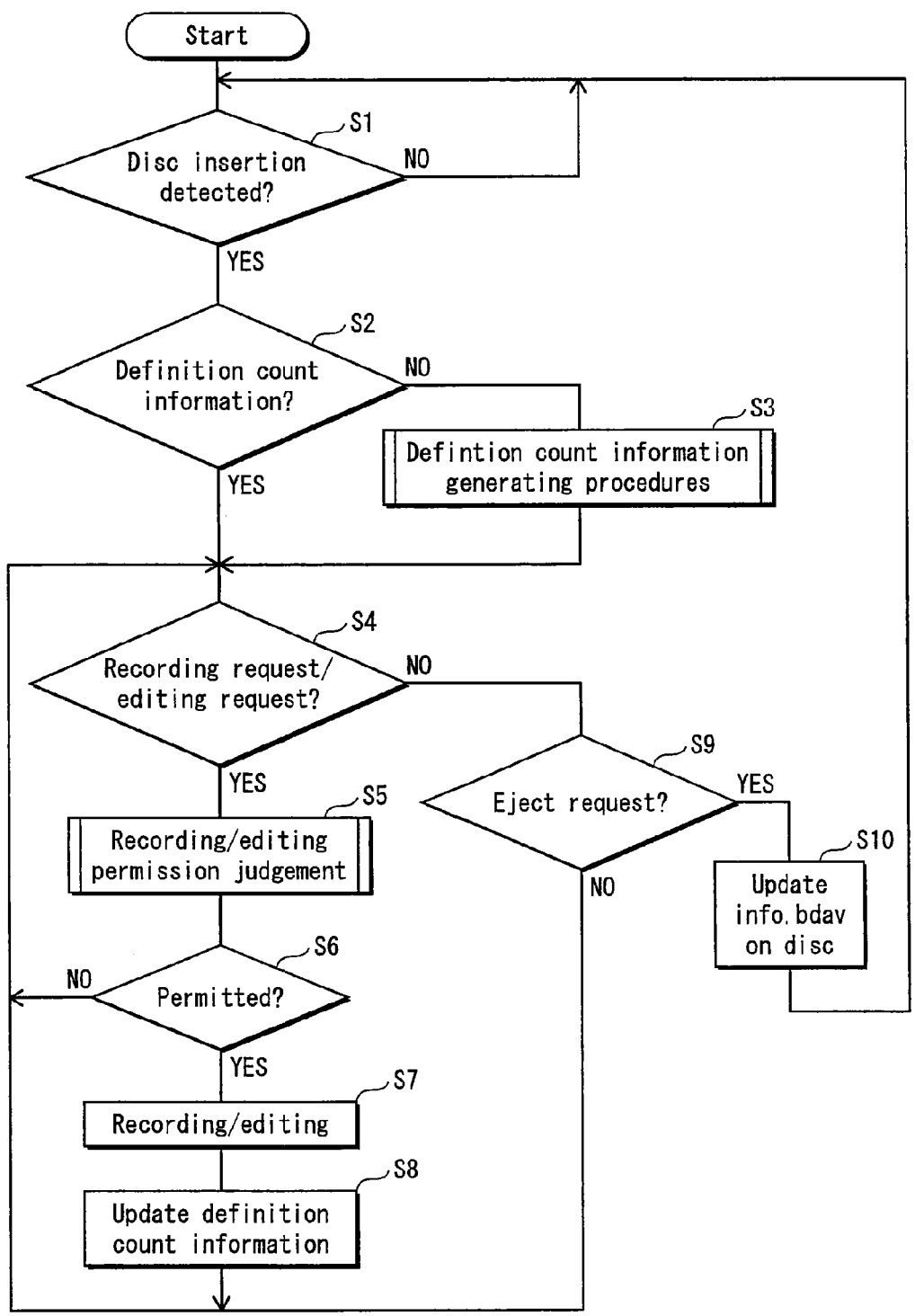
FIG. 9 is a flowchart showing controlling procedures performed by a control unit 13.

FIG. 9 is a flowchart showing the controlling procedures performed by the control unit 13.

The control unit 13 waits for the BD-RE 100 to be inserted and detected (Step S1). If detected (Step S1: YES), the control unit 13 judges whether or not definition count information is contained in the info.bdav file recorded on the BD-RE 100 (Step S2).

At the judgment in Step S2, the control unit 13 instructs the data management information acquiring unit 3 to read the info.bdav file from the BD-RE 100, and instructs the memory unit 5 to cache the info.bdav file as the info.bdav cache (e). If the info.bdav cache (e) does not contain definition count information (Step S2: NO), the control unit 13 performs definition count information generating procedures shown in FIG. 10 (Step S3), to cause the definition count information generating unit 3 and the signature code creating unit 8 to generate the definition count information and the signature code respectively, and to add the generated definition count information (c) and signature code (d) to the info.bdav cache (e) held in the memory unit 5. In the definition count information generating procedures, the data management information recording unit 6 overwrites the info.bdav file on the BD-RE 100 with the info.bdav cache (e) to which the definition count information (c) and the signature code (d) has been added.

After the memory unit 5 is given the definition count information and holds it through the procedures in Step S1 an Step S2, the control unit 13 waits for notification from the UI unit 11 (Step S4, Step S9). This notification is of a request for recording of an AV stream file, a request for editing of the management information such as the info.bdav file, the PLAYLIST files and the CLIP information files, and a request for ejecting the BD-RE 100.

If the request for ejecting the BD-RE is accepted (Step S9: YES), the control unit 13 instructs the data management information recording unit 6 to updates the info.bdav file on the BD-RE 100 with the info.bdav cache (e) held in the memory unit 5 (Step S10). After that, the control unit 13 returns to Step S1 and waits for the BD-RE 100 to be inserted and detected.

In Step S4, if a request for recording or editing is notified (Step S4: YES), the control unit 13 performs recording/editing permission judging procedures shown in FIG. 13, to cause the signature code verifying unit 9 and the recording/editing permission judging unit 10 to judge whether or not the requested, recording or editing is permitted. If judged that the requested recording or editing is not permitted (Step S6: NO), the control unit 13 returns to Step S4 and Step S9 without permitting the recording/editing unit 7 to record or edit the AV stream, and waits for a new request from the UI unit 11.

On the other hand, if it is judged in the recording/editing permission judging procedures that the requested recording or editing is permitted (Step S6: YES), the control unit 13 causes the recording/editing unit 7 to performs the recording or editing of the AV stream (Step S7). Upon completion of the execution of the recording or editing of the AV stream, the control unit 13 causes the definition count information creating unit 4 and the signature code creating unit 8 to update the definition count information (c) and the signature code (d) held in the memory unit 5 respectively, according to the result of the execution (Step S8). The control unit 13 causes the data management information recording unit 6 to update the info.bdav file recorded on the BD-RE 100 with the info.bdav cache (e) which has been updated. After that, the control unit 13 returns to Step S4 and Step S9, and waits for a notification of a new request from the UI unit 11.

This completes the description of the controlling procedures performed by the control unit 13. Due to the controlling procedures, the recording/editing apparatus pertaining to the embodiment is not required to check all the PLAYLIST files and all the CLIP information files on the BD-RE 100 whenever it records or edits data on the BD-RE 100. Thus the recording/editing apparatus quickly executes recording and editing of data on the BD-RE 100.

<Definition count information generating procedures>

The following explains the details of the definition count information generating procedures and the recording/editing permission judging procedures, which are performed under the control of the control unit 13.

Figure 10:
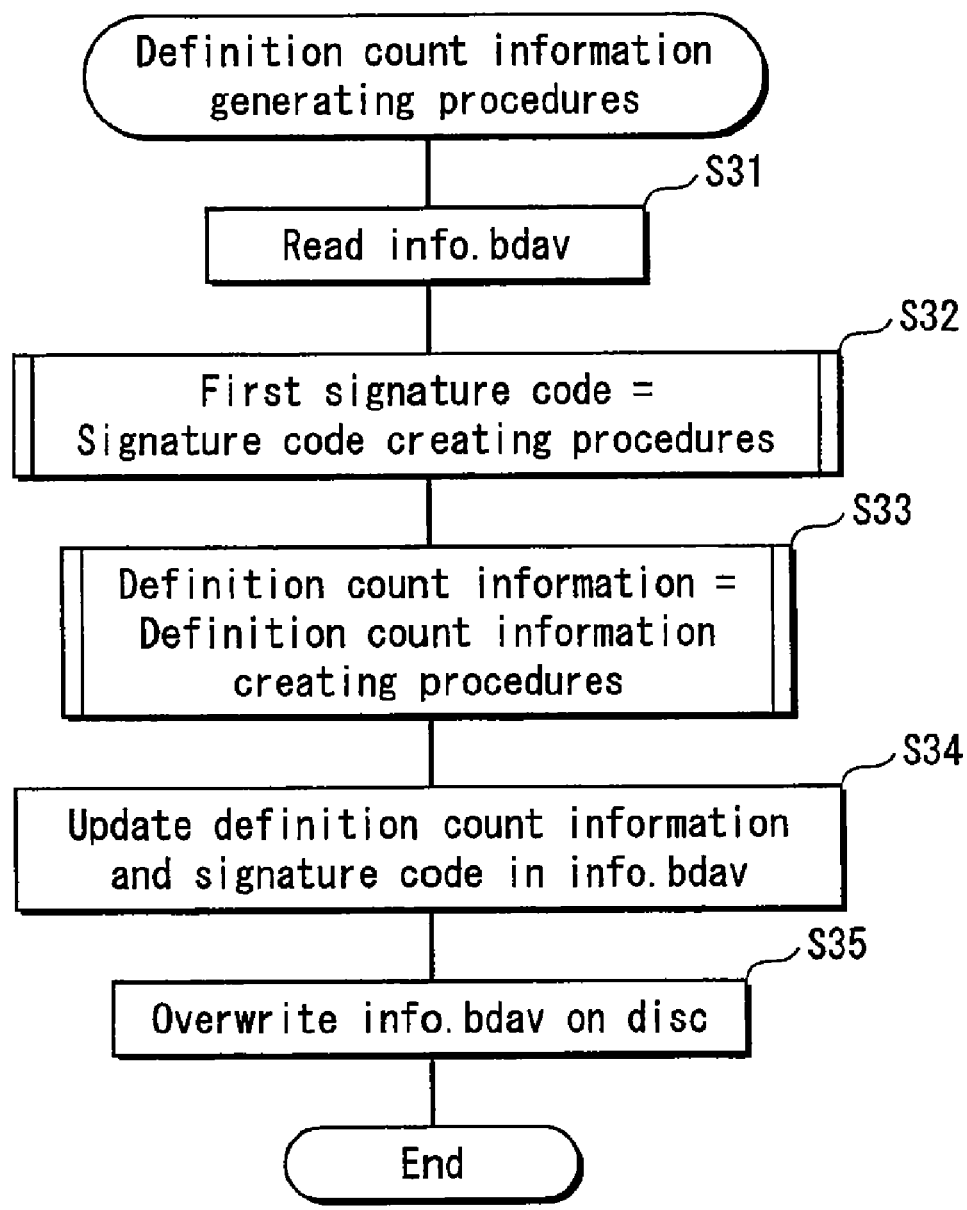
FIG. 10 is a flowchart showing procedures for generation of the definition count information.

First, the details of the definition count information generating procedures are explained with reference to FIG. 10. FIG. 10 is a flowchart showing the definition count information generating procedures.

In the definition count information generating procedures, first, the data management information acquiring unit 3 reads the info.bdav file from the BD-RE 100, and outputs it as the info.bdav cache (e) to the memory unit 5 (Step S31). Next, the signature code creating unit 8 obtains a signature code by performing signature code creating procedures shown in FIG. 11 (Step S32), and the definition count information creating unit 4 obtains definition count information by performing definition count information creating procedures shown in FIG. 12 (Step S33).

Figure 11:
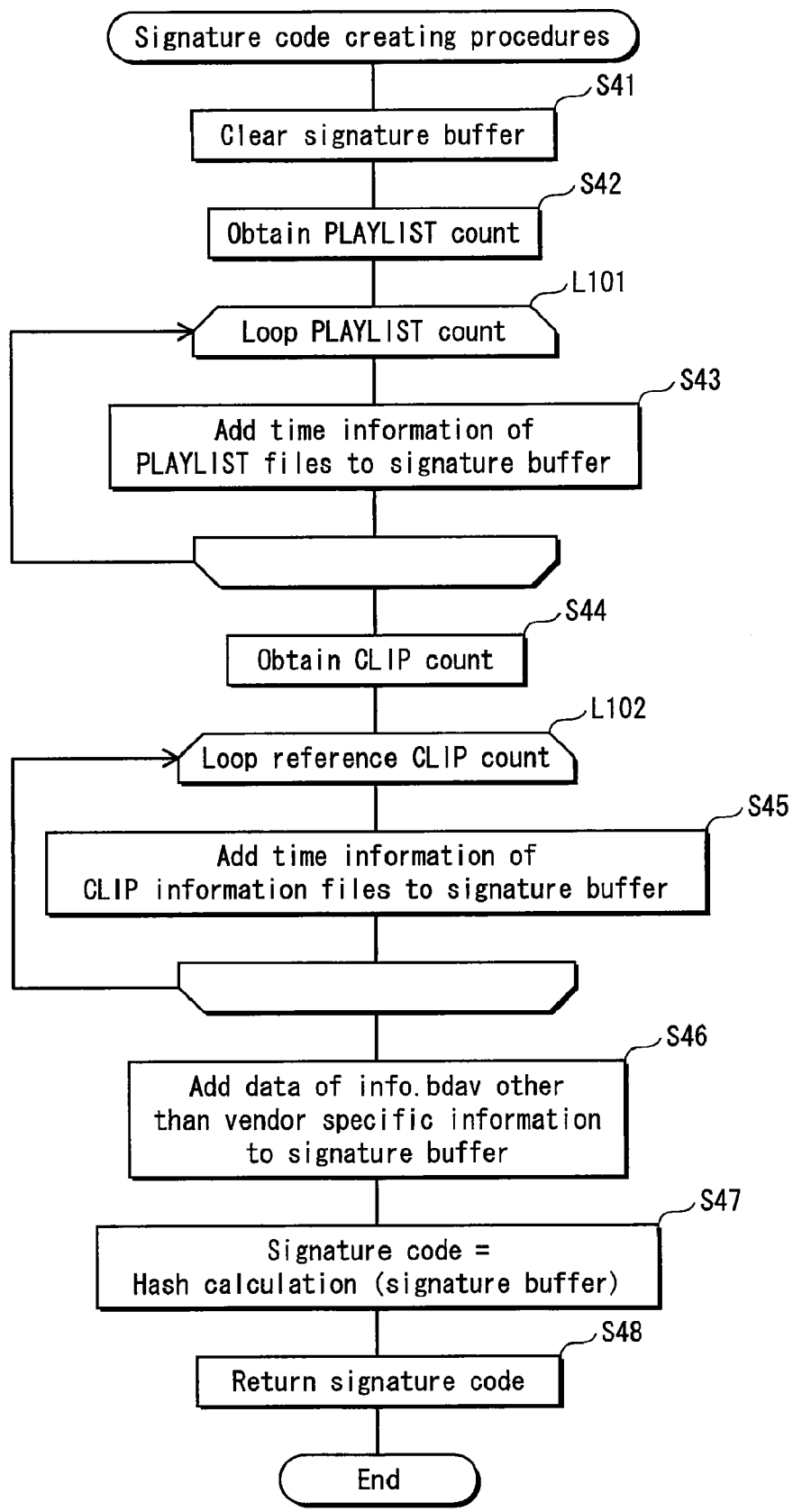
FIG. 11 is a flowchart showing procedures for generation of a signature code performed by a signature code creating unit 8.

In the signature code generating procedures in Step S32, as shown in FIG. 11 in detail, the signature code creating unit 8 initializes a signature buffer in Step S41. The signature buffer is prepared in the memory unit 5 to store primary information for the signature code generation. Next, in Step S42, the signature code creating unit 8 obtains, as the PLAYLIST count, the number of the PLAYLIST files existing under the PLAYLIST directory. Next, through the loop L101, the signature code creating unit 8 repeats the procedure in Step S43 for the number of times indicated by the PLAYLISTS count obtained in Step S42. The procedure in Step S43 is performed for adding the update time of each PLAYLIST file under the PLAYLIST directory into the signature buffer. Thus, as a result of the execution of the loop L101, the update times of all the PLAYLIST files under the PLAYLIST directory are added into the signature buffer. Next, in Step S44, the signature code creating unit 8 obtains, as a CLIP count, the number of the CLIP information files existing under the CLIPINF directory. Next, through the loop L102, the signature code creating unit 8 repeats the procedure in Step S45 for the number of times indicated by the CLIP count obtained in Step S44. The procedure in Step S45 is performed for adding the update time of each CLIP information file under the CLIPINF directory into the signature buffer. Thus, as a result of the execution of the loop L102, the update times of all the CLIP information files under the PLAYLIST directory are added into the signature buffer. Next, in Step S46, the signature code creating unit 8 adds the part of the info.bdav cache other than the vendor specific information into the signature buffer. In Step S47, the signature code creating unit 8 inputs the data in the signature buffer to a hash function, and obtains the resultant hash value as a signature code. In Step S48, the signature code creating unit 8 returns the signature code to the caller of the signature code creating procedures.

Note that a hash function, which is used in Step S47, is a function for generating a value within a certain range, based on the original data. Ideally, the hash value is different when the data is different. For example, algorithms MD5 (Message Digest Algorithm 5) and SHA (Secure Hash Standard) are known.

As a result of the signature code creating procedures, the signature code creating unit 8 obtains the signature code that is uniquely defined based on the update times of the PLAYLIST files and the CLIP information files and the standard information of the info.bday.

Figure 12:
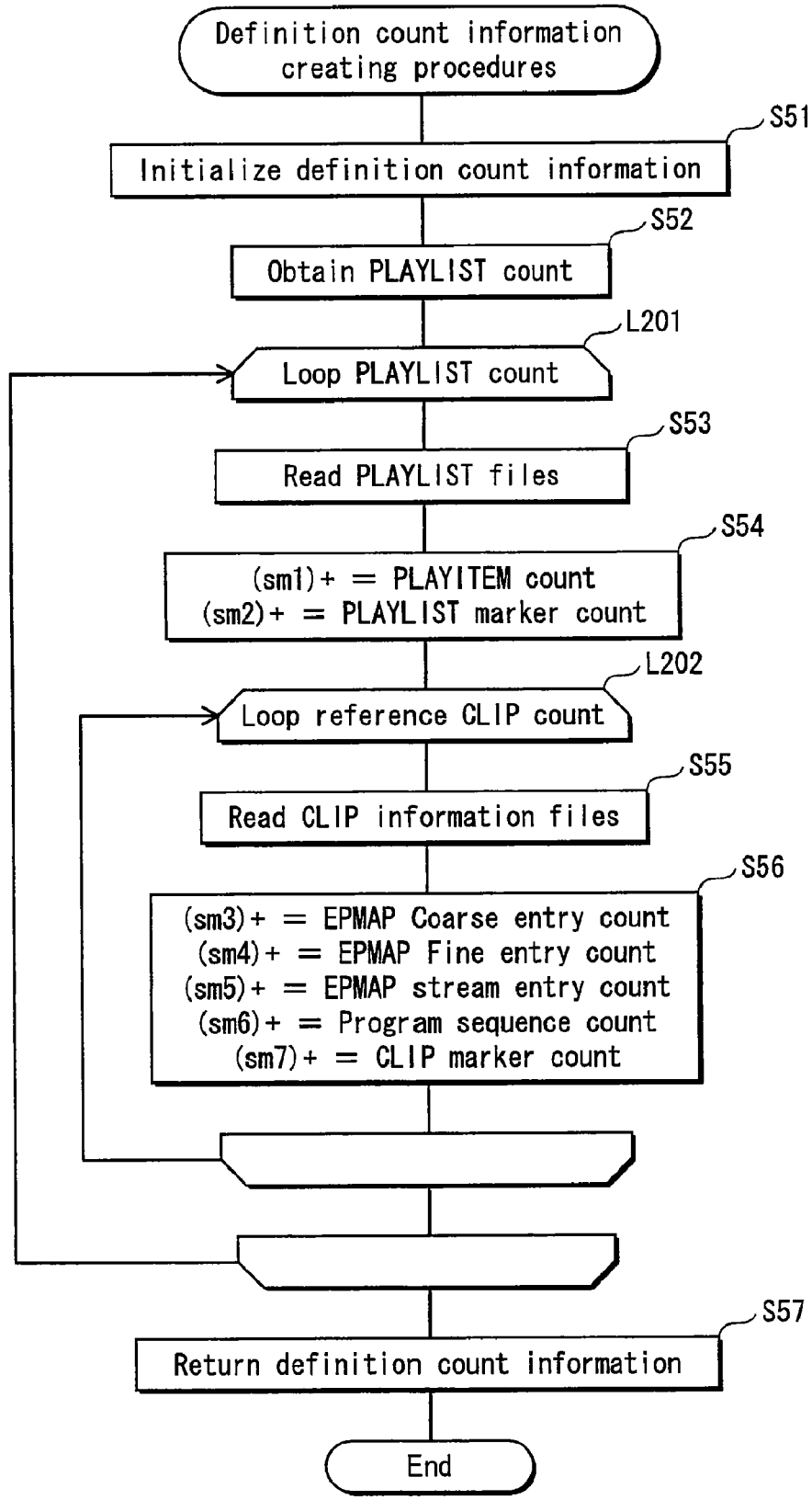
FIG. 12 is a flowchart showing procedures for generation of the definition count information performed by a definition count information creating unit 4.

Meanwhile, through the definition count information creating procedures in Step S33, as shown in FIG. 12 in detail, the definition count information creating unit 4 initializes all the items of the definition count information to be 0 in Step S51. Next, in Step S52, the definition count information creating unit 4 obtains the PLSYLIST count from the info.bdav cache. Next, in the loop L201, the definition count information creating unit 4 repeats the procedures in Step S53, Step S54 and the loop L202 for the number of times indicated by the PLAYLIST count obtained in Step S52. The procedure in Step S53 is performed for reading each of the PLAYLIST files indicated by the reference PLAYLIST file name in the info.bdav cache. The procedure in Step S54 is performed for obtaining the PLAYITEM count and the PLAYLIST marker count from the PLAYLIST file read in Step S53, and adding the counts to the values of the items sm1 and sm2 in the definition count information respectively.

In the loop L202, the definition count information creating unit 4 repeats the procedures in Step S55 and Step S56 for the number of times indicated by the count of the CLIPs referred to from PLAYITEMs shown in the PLAYLIST file read in Step S53. The procedure in Step S55 is performed for reading the reference CLIP information file of each of the PLAYITEMs shown in the PLAYLIST file read in Step S53. The procedure in Step S56 is performed for obtaining the EPMAP Coarse entry count, the EPMAP FINE entry count, the EPMAP stream entry count, the program sequence count and the CLIP marker count from the CLIP information file read in Step S55, and adding these counts to the values of the items sm3, sm4, sm5, sm6 and sm7 in the definition count information respectively. The loop L202 is performed for obtaining values required for the definition count information from all the reference CLIP information files referred to from the PLAYLIST file read in Step S53, and adding the obtained values to the definition count information. The loop L201 is performed for obtaining values required for the definition count information from all the reference PLAYLIST files recorded in the info.bdav cache obtained in Step S52, and all the reference CLIP information files referred to from the reference PLAYLIST files, and adding the obtained values to the definition count information. The definition count information obtained through such procedures is output in Step S57 to the caller of the procedures.

As a result of the definition count information creating procedures explained above, the definition count information creating unit 4 obtains the definition count information in which the pieces of information recorded in a plurality of PLAYLIST files and CLIP information files are brought together.

Again in FIG. 10, which explains the definition count information generating procedures, the signature code creating unit 8 and the definition count information creating unit 4 respectively write the signature code (d) and the definition count information (c) into the info.bdav cache (e) held in the memory unit 5 (Step S34). The signature code (d) and the definition count information (c) are generated and obtained respectively through the signature code creating procedures and the definition count information creating procedures explained above. Subsequently, the data management information recording unit 6 reads, from the memory unit 5, the info.bdav cache (e) into which the signature code (d) and the definition count information (c) have been written, and overwrites the info.bdav on the BD-RE 100 with the info.bdav cache (e) (Step S35).

This completes the detailed description of the definition count information creating procedures.

<Recording/editing permission judging procedures>

Figure 13:
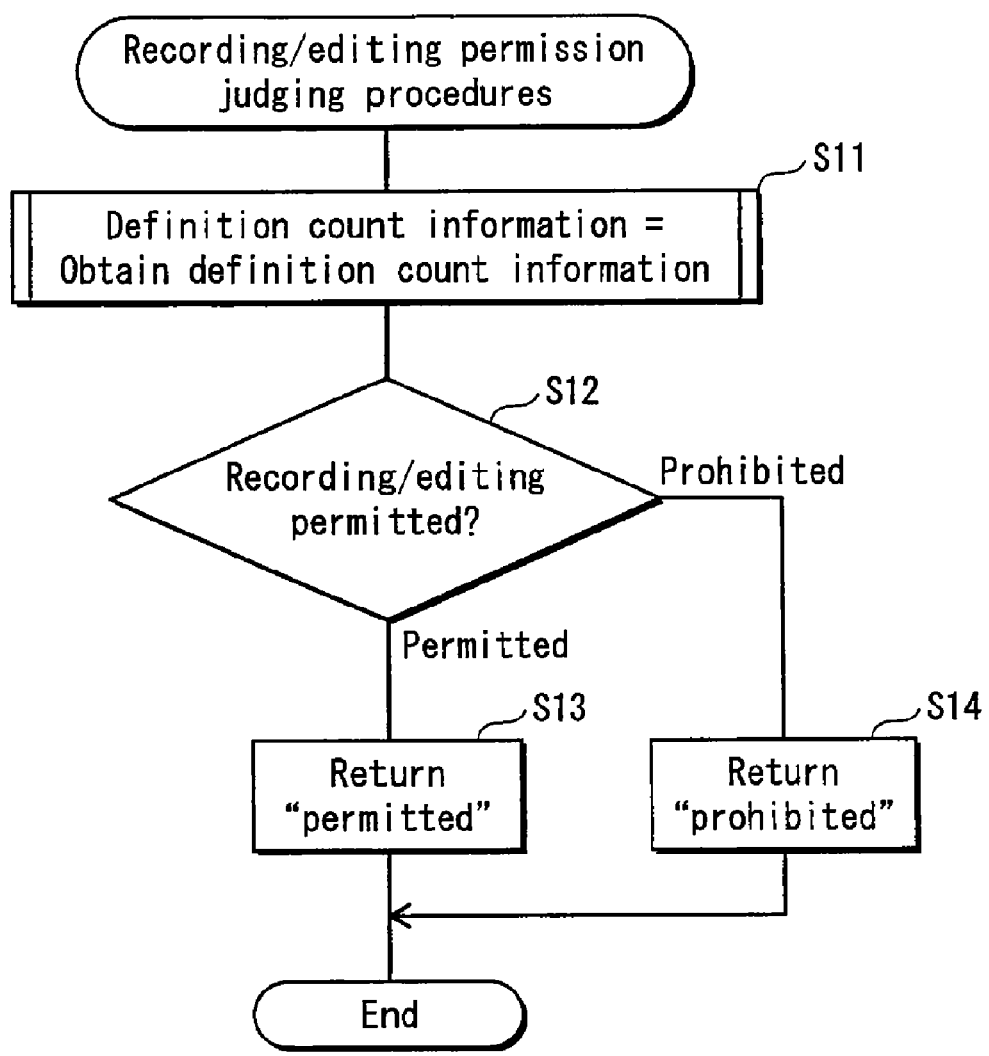
FIG. 13 is a flowchart showing procedures for recording/editing permission judgment.
Figure 14:
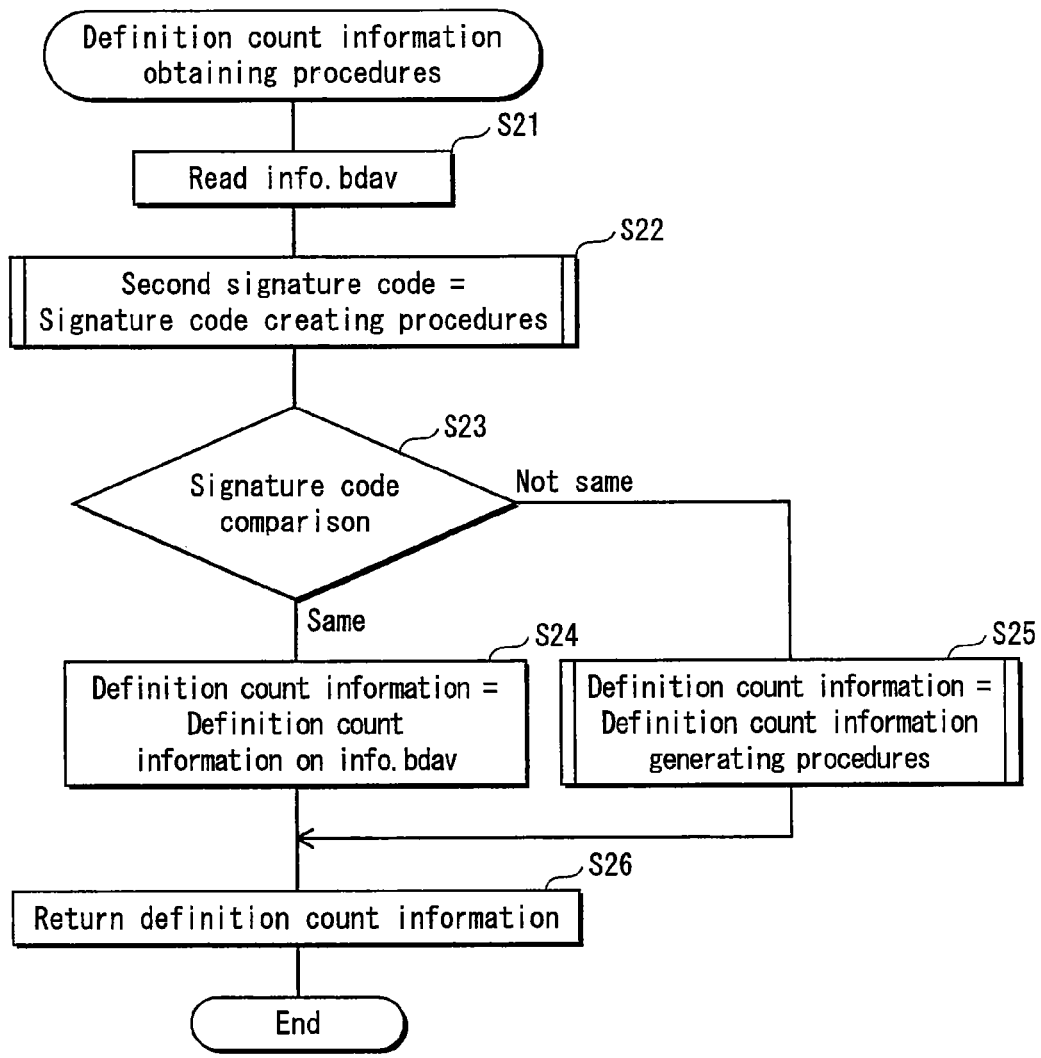
FIG. 14 is a flowchart showing procedures for acquisition of definition count information.

The following explains the recording/editing permission judging procedures in detail with reference to FIG. 13 and FIG. 14. FIG. 13 is a flowchart showing the recording/editing permission judging procedures.

In the recording/editing permission judging procedures, first, the recording/editing permission judging unit 10 obtains the definition count information through definition count information obtaining procedures (Step S11).

In the definition count information obtaining procedures in Step S11, as shown in FIG. 14 in detail, the signature code verifying unit 9 obtains the signature code (d) as a first signature code from the info.bdav cache (e) held in the memory unit 5, in Step S21. Next, in Step S22, the signature code creating unit 8 generates a signature code through signature code creating procedures in Step S22. The signature code verifying unit 9 obtains the created signature code as a second signature code.

After that, the signature code verifying unit 9 checks whether or not the first signature code obtained in Step S21 and the second signature code obtained in Step S22 are the same (S23). If they are the same (Step S23: YES), the signature code verifying unit 9 obtains the definition count information (c) from the info.bdav cache (e) held in the memory unit 5 (Step S24). If they are not the same (Step S23: NO), the signature code verifying unit 9 causes the definition count information creating unit 4 to create definition count information through the definition count information creating procedures, and obtains the created definition count information (S25). In Step S26, the signature code verifying unit 9 outputs the definition count information obtained in Step S24 or S25 to the caller of the definition count information obtaining procedures.

As explained above, the signature code verifying unit 9 obtains the latest definition count information through the definition count information obtaining procedures.

Again in FIG. 13, which explains the recording/editing permission judging procedures, the recording/editing permission judging unit 10 judges whether or not the recording or the editing can be performed (Step S12) by using the definition count information obtained in Step S11.

Specifically, the recording/editing permission judging unit 10 performs the judgment in Step S12 in the following manner. The recording/editing permission judging unit 10 compares the values of the items in the definition count information with their respective upper limits defined in the BDRE 2.0 standard shown in FIG. 6. If all the values of the items are less than their upper limits, the recording/editing permission judging unit 10 judges that the recording/editing is permitted. If any of the values of the items are not less than their upper limits, the recording/editing permission judging unit 10 judges that the recording/editing is prohibited.

As a result of the judgment explained above, if the recording/editing is permitted, the recording/editing permission judging unit 10 notifies the caller of the recording/editing permission judging procedures that the recording or the editing is permitted (Step S13). If the recording/editing is prohibited, the recording/editing permission judging unit 10 notifies the caller of that the recording or the editing is prohibited (Step S14).

This completes the detailed description of the recording/editing permission judging procedures.

<Summary>

According to the embodiment explained above, the counts of already recorded definitions provided in the items, which each have the upper limit of the number recordable on the BD-RE 100, are recorded in a single file on the BD-RE 100. Thus, it is unnecessary for the recording/editing apparatus to read all the PLAYLIST files and all the CLIP information files from the BD-RE 100 every time it records/edits AV streams on the BD-RE 100. Instead, only reading of the single info.bdav file containing the definition count information enables the recording/editing apparatus to immediately perform data writing or data reading on a BD-RE medium.

Moreover, a signature code, which is based on PLAYLIST files and CLIP information files at the time the definition count information is created, is recorded together with the definition count information. Thus, by comparing this signature code with the signature code at the time of the data recording/editing permission judgment, it is possible to check whether or not the PLAYLIST files and the CLIP information files have been edited by an apparatus that does not support the present invention and does not update the definition count information. Consequently, it is possible to avoid that the data recording/editing permission judgment is made based on incorrect definition count information.

According to the embodiment above, the signature code is created based on the update times of the management information such as the PLAYLIST files and the CLIP information files. However, any other information may be used as long as the information is unique to the state of the management information at the time the definition count information is created. For example, it is possible to create an appropriate signature code by using recording addresses of the management information on the recording medium. Alternatively, a signature code may be created from both the update times and the recording addresses of the management information. Such update times and recording addresses lead to versatility, because it is possible to obtain them by using a standard functions commonly provided by file systems.

According to the embodiment above, the definition count information recorded on the BD-RE 100 is overwritten with new information every time the BD-RE 100 is ejected from the recording/editing apparatus 200 or the recording/editing unit 7 records an AV stream or edits the management information. If the definition count information is updated at the recording of AV streams or editing of the management information, only the items that have been changed by the recording or the editing require the addition of counts. This realizes efficient updating of the definition count information.

However, the updating of the definition information count recorded on the BD-RE 100 may be performed under different conditions, instead of being performed with the stated timing. For example, the updating of the definition information count recorded on the BD-RE 100 may be performed when the timer unit 12 counts a predetermined period or longer from when the UI unit 11 accepts a user operation to when it accepts the next user operation. With such a configuration, the recording/editing apparatus creates or updates the definition count information while not performing any other operations. This realizes effective usage of the resources for the recording/editing apparatus.

Note that at the updating of an info.bdav file, the recording/editing unit 7 may write the updated info.bdav file as an info.bdav cache into the memory unit 5 while recording or editing data on the BD-RE 100. As a result, it becomes possible to omit the reading of the info.bdav file in the subsequent definition count information generation procedures and improve the processing speed.

MODIFICATION EXAMPLES (1) The embodiment above explains an example of addition of the definition count information and the signature code to the vendor specific information included in the info.bdav file. According to this example, the signature code is used for securing the content of the definition count information on the assumption that the definition count information might be incorrect due to recording or editing performed by an apparatus to which the present invention is not adopted, that is, an apparatus that does not create definition count information.

However, in the case of standards in which definition count information is included as standard information in the info.bdav file, it is unnecessary to add the signature code to the definition count information for securing the content of it, as long as recording and editing on a BD-RE medium is performed with an apparatus in conformity with the standards.

Alternatively, in the case of the modification example where the definition count information is included as standard information in the info.bdav file, a definition count validity flag (i7) may be added to the info.bdav file as FIG. 15 shows. If this is the case, the definition count validity flag (i7) is set OFF when the recording or editing is performed by an apparatus that does not support the definition count information, to indicate the possibility that the definition count information is incorrect. When the definition count validity flag (i7) in the info.bdav file is OFF, the recording/editing apparatus pertaining to the present invention, which supports the definition count information, may create new definition count information and update the info.bdav file recorded on the BD-RE medium by rewriting it with the new definition count information.

(2) The definition count information pertaining to the present invention and the signature code of the definition count information are not necessary recorded on the info.bdav file. That is, the definition count information and signature code shown in FIG. 7 may be recorded on the BD-RE medium as a single definition count file separately from the info.bdav file.

Also, the definition count information and the signature code are not necessarily recorded as a single definition count file. For example, the recording/editing apparatus pertaining to the present invention may separately record on the BD-RE medium a first definition count file which indicates the definition counts of the items of the PLAYLIST files and a second definition count file which indicates the definition counts of the items of the CLIP information files.

Moreover, in the case of standards in which the definition count information is defined, the signature code is not necessarily required. Thus, the definition count file may not include the signature code.

Other Modification Examples

In the explanation above, the present invention is described based on the embodiment. However, the present invention is not limited to the embodiment as a matter of course. The present invention includes the following modifications.

(1) The present invention may be a recording/editing method shown as the processing procedures represented with the flowcharts of the embodiment explained above. Also, the present invention may be a computer program including program codes used for causing a computer to operate according to the processing procedures, or a digital signal formed from the computer program.

Furthermore, the present invention may be a computer-readable recording medium such as a flexible disk, a hard disk, a CD-ROM, an MO, a DVD-ROM, a DVD-RAM, a BD (Blu-ray Disc) or a semiconductor memory, that stores the computer program or the digital signal.

Furthermore, the present invention may be the computer program or the digital signal transmitted on an electric communication line, a wireless or wired communication line, or a network of which the Internet is representative.

Also, the computer program or digital signal may be conveyed to another independent computer system either via the network or by being recorded on the recording medium, and then implemented by the other computer system.

(2) The present invention may be realized as an LSI for controlling the recording/editing apparatus explained based on the embodiment above. Such an LSI can be realized as integration of the functional blocks shown in FIG. 8. These functional blocks may be realized separately with individual chips, or part or all may be included on one chip.

Note that though LSI is used here, the circuit may be variously described as IC, system LSI, super LSI or ultra LSI depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field semiconductor technology or the derivation of another technology, a technology to replace LSI emerges, that technology may, as a matter of course, be used to integrate the functional block. The use of biotechnology, or the like is considered to be a possibility.

(3) In the explanation of the embodiment above, portions of the BDRE 2.0 standard relative to the present invention is excerpted, and only representative directories and files are used for the explanation. However, needless to say, the present invention may be implemented as an apparatus that performs recording or editing on a BD-RE concerning other files defined in the BDRE 2.0 standard.

(4) In the explanation of the embodiment above, a BD-RE in conformity with the BDRE 2.0 standard is used as an example. However, the features of the present invention do not have a dependence on the physical characteristics of the BD-RE. Thus the present invention is applicable to other readable/writable recording media. Specifically, the present invention is applicable to any recording/playback apparatuses for recording/playback media as long as the media is in conformity with a standard that defines a data structure including first data management information recorded on a recording/playback medium and a plurality of second data management information pieces refereed to from the first data management information, and requires analysis of all the information for execution of the recording or the editing in conformity with the standard.

(5) In the explanation of the embodiment above, a recording/editing apparatus that has a function to record or edit data on a BD-RE is described as an example. However, as a matter of course, the present invention may be applied to a recording/editing apparatus that has a playback function as well as the recording/editing function.

(6) The present invention may be any combination of the above-described embodiment and modifications.

Industrial Applicability

A recording/editing apparatus pertaining to the present invention is applicable to an apparatus that performs writing to a removable recording/playback medium in conformity with a standard to improve the reading speed.

The invention claimed is:

1. A recording/editing apparatus that controls recording of a file for playback and a plurality of management information pieces onto a readable and writable recording medium, and editing of the file for playback and the management information pieces recorded on the recording medium, the management information pieces each defining items used for playback control of the file for playback, the recording/editing apparatus comprising:

a recording unit operable to record definition count information onto the recording medium, the definition count information indicating, for each of the items, a count of definitions that have been already provided in the corresponding item;

a first signing unit operable to generate first signature information from information of a state of each management information piece as of a time the definition count information is recorded by the recording unit;

a signature recording unit operable to record the first signature information onto the recording medium;

a second signing unit operable, upon a request for the recording and the editing, to generate second signature information from the information of a state of each management information piece as of a time the request is received; and a permitting unit operable to permit the recording and the editing upon the request, on a condition that none of values of the definition count information has reached a maximum count of definitions in the corresponding item recordable on the recording medium and that the fist signature information is identical to the second signature information.

2. The recording/editing apparatus of claim 1, wherein the recording unit records the definition count information into a single file on the recording medium.

3. The recording/editing apparatus of claim 2, wherein
the management information pieces include playback path information that shows a playback path of the file for playback and stream information that contains an entry map, and
the maximum count is provided at least for a count of definitions of playback sections each consisting of a pair of a playback start time and a playback end time, a count of definitions of chapters, a count of definitions of entry points of the file for playback, and a count of definitions of program sequences included in the file for playback.

4. The recording/editing apparatus of claim 3, wherein
the information of the state of each management information piece is at least one of: an update time of the corresponding management information piece; and a recording address of the corresponding management information piece on the recording medium.

5. The recording/editing apparatus of claim 3, wherein
the recording unit records the definition count information after a predetermined procedure is performed.

6. The recording/editing apparatus of claim 5, wherein
the predetermined procedure is one of: recording and editing of a file for playback executed in advance of the recording and the editing permitted by the permitting unit; mounting of the recording medium; and receiving of a request for removal of the recording medium.

7. The recording/editing apparatus of claim 3, wherein
the recording unit records the definition count information on elapse of a predetermined period in which no user operation is performed.

8. A recording/editing method used in a recording/editing apparatus for controlling recording of a file for playback and a plurality of management information pieces onto a readable and writable recording medium, and editing of the file for playback and the management information pieces recorded on the recording medium, the management information pieces each defining items used for playback control of the file for playback, the recording/editing method comprising:

a recording step in which a recording unit of the recording/editing apparatus records definition count information onto the recording medium, the definition count information indicating, for each of the items, a count of definitions that have been already provided in the corresponding item;

a first signing step in which a first signing unit of the recording/editing apparatus generates first signature information from information of a state of each management information piece as of a time the definition count information is recorded by the recording step;

a signature recording step in which a signature recording unit of the recording/editing apparatus records the first signature information onto the recording medium;

a second signing step in which a second signing unit of the recording/editing apparatus, upon a request for the recording and the editing, generating second signature information from the information of a state of each management information piece as of a time the request is received; and a permitting step in which a permitting unit of the recording/editing apparatus permits the recording and the editing upon the request, on a condition that none of values of the definition count information has reached a maximum count of definitions in the corresponding item recordable on the recording medium and that the fist signature information is identical to the second signature information.

9. The recording/editing apparatus of claim 1, wherein the file for playback is an AV stream file.

\* \* \* \* \*